(12) United States Patent  (10) Patent No.: US 8,131,140 B2
Kurosawa  (45) Date of Patent: *Mar. 6, 2012

(54) LINEAR ACTUATOR AND CAMERA SHAKE CORRECTION MECHANISM

(75) Inventor: Yuichi Kurosawa, Tokyo (JP)

(73) Assignee: Pentax Ricoh Imaging Company, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/699,948

(22) Filed: Feb. 4, 2010
(Under 37 CFR 1.47)

(65) Prior Publication Data

US 2010/0322606 A1    Dec. 23, 2010

(30) Foreign Application Priority Data

Feb. 5, 2009 (JP) ................................. 2009-024722

(51) Int. Cl.
G03B 17/00 (2006.01)
H04N 5/228 (2006.01)
(52) U.S. Cl. .................................... 396/55; 348/208.11
(58) Field of Classification Search .................... 396/55; 348/208.11
See application file for complete search history.

(56) References Cited

U.S. PATENT DOCUMENTS 6,040,642 A    3/2000 Ishiyama
(Continued)

FOREIGN PATENT DOCUMENTS

JP    10-313566    11/1998
(Continued)

*Primary Examiner* — Rodney Fuller
(74) *Attorney, Agent, or Firm* — Greenblum & Bernstein, P.L.C.

(57) ABSTRACT

A linear actuator includes a multipolar magnet configured such that an S pole and an N pole are linearly aligned in an alternating manner. The linear actuator also includes a coil body having a plurality of separate coil units integrally arranged in a lengthwise direction of the coil body, and being movable relative to the multipolar magnet. The linear actuator further includes a magnetic sensor that detects a position of the coil body along the lengthwise direction of the coil body with respect to the multipolar magnet, and an electrifying control circuit that individually controls currents to be supplied to the plurality of coil units based on the position of the coil body detected by the magnet sensor.

13 Claims, 8 Drawing Sheets

U.S. PATENT DOCUMENTS

| | | | |
|---|---|---|---|
| 2007/0237508 A1* | 10/2007 | Hsieh et al. | 396/55 |
| 2009/0195087 A1 | 8/2009 | Kurosawa | |
| 2009/0195878 A1 | 8/2009 | Kurosawa | |
| 2010/0020184 A1 | 1/2010 | Kurosawa | |
| 2010/0097017 A1* | 4/2010 | Oteman et al. | 318/376 |

FOREIGN PATENT DOCUMENTS

| | | |
|---|---|---|
| JP | 2007-282475 | 10/2007 |

* cited by examiner

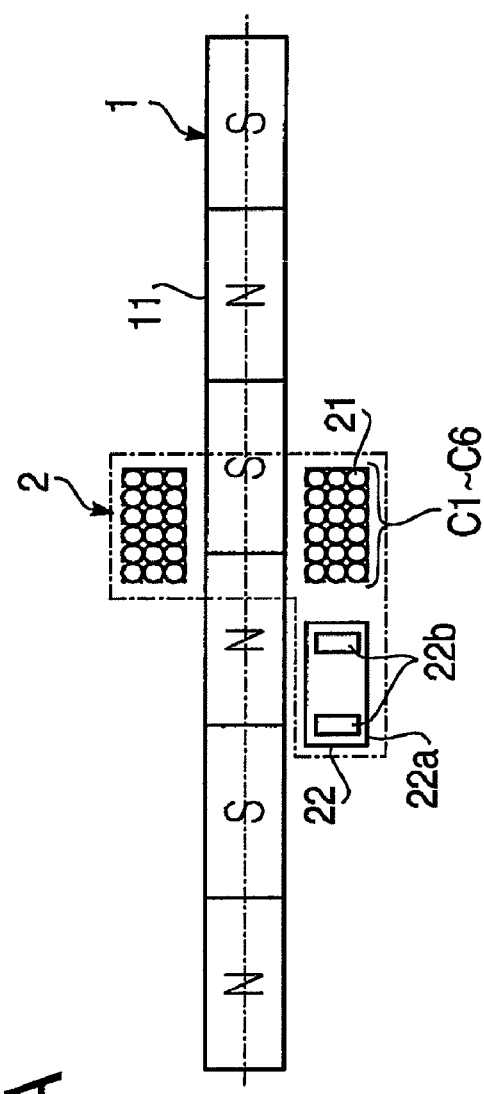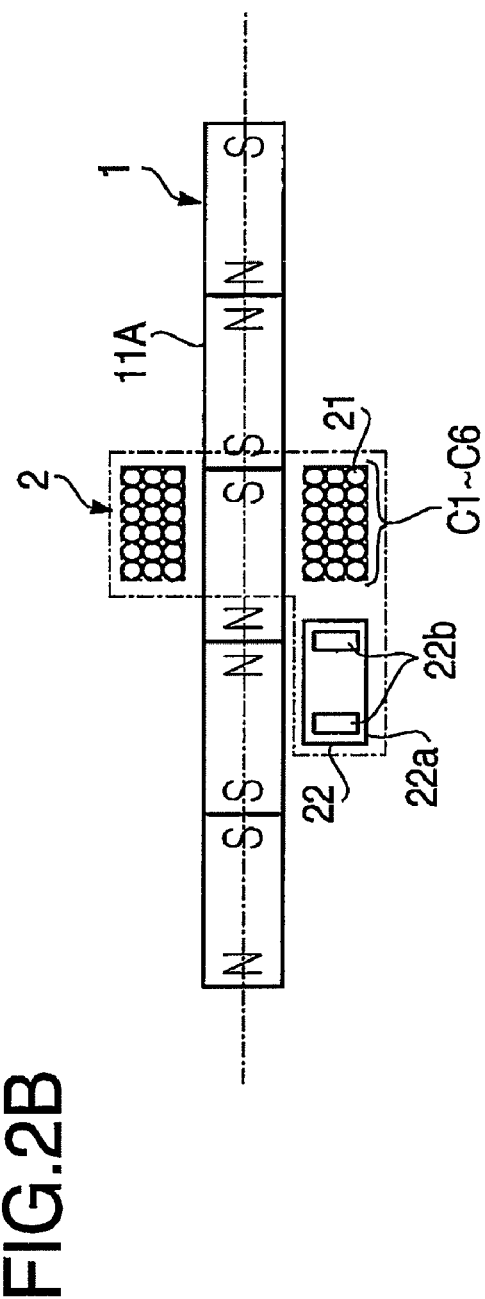
FIG.2A
FIG.2B

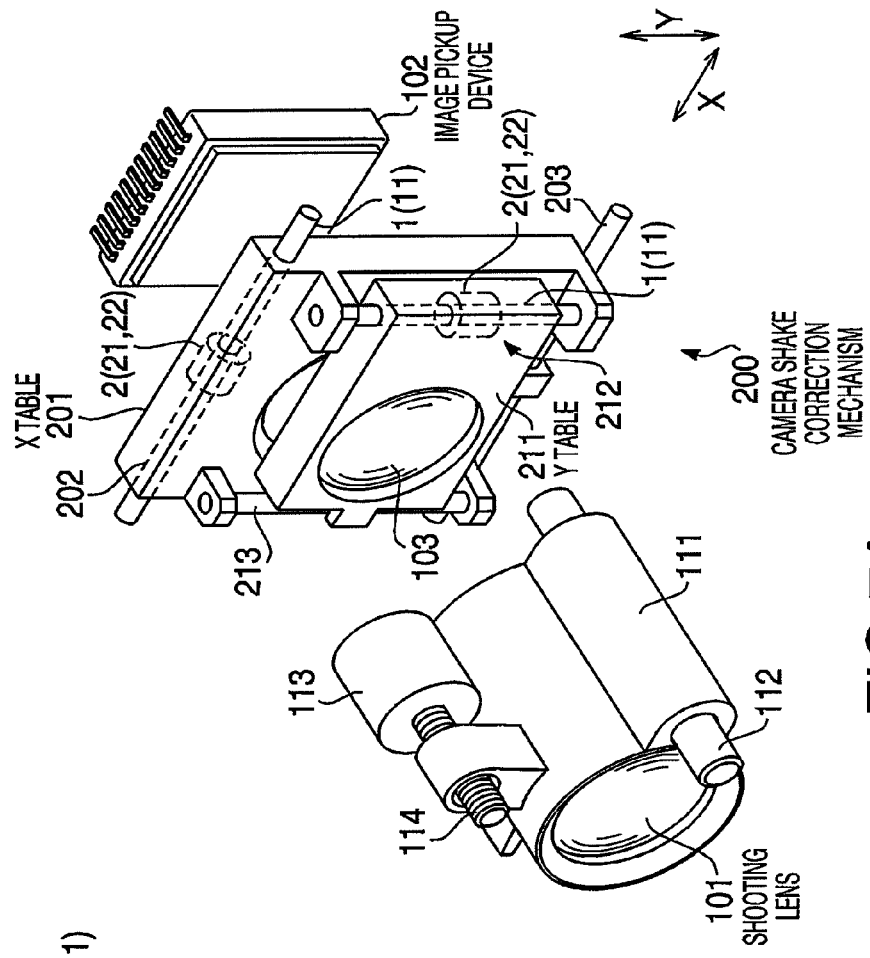
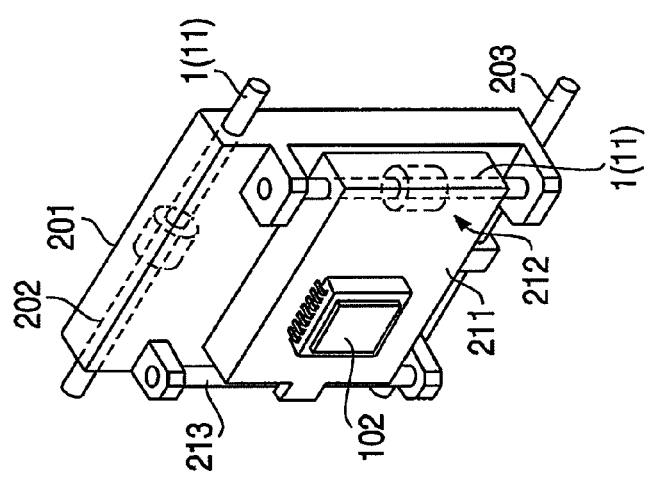
FIG. 7A
FIG. 7B

FIG. 8A THREE – PHASE COIL BODY
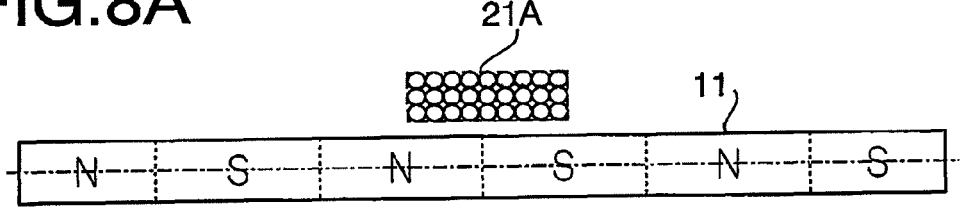
FIG. 8B
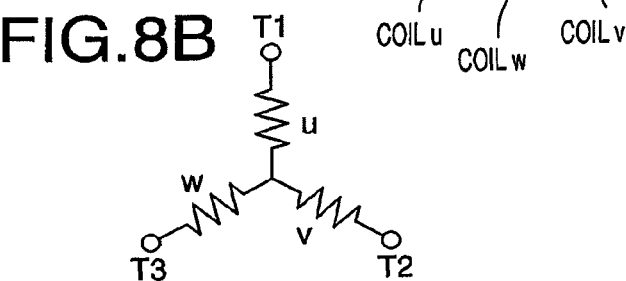
FIG. 8C
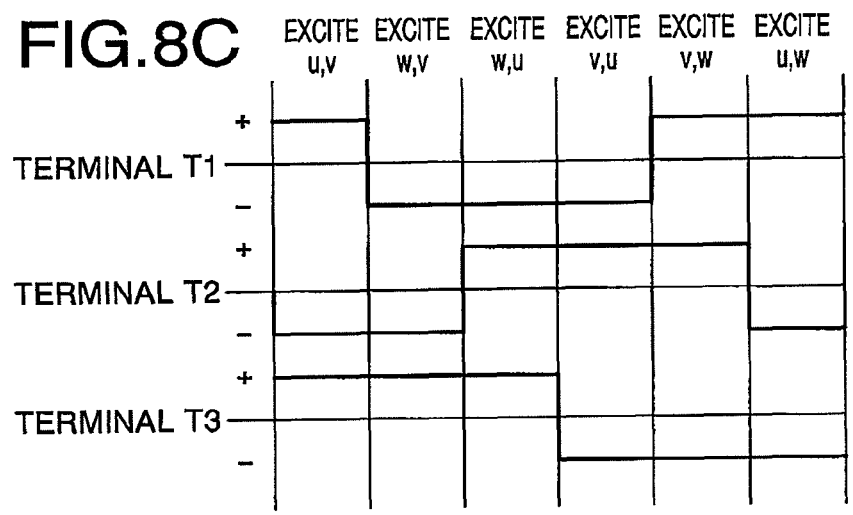
FIG. 8D
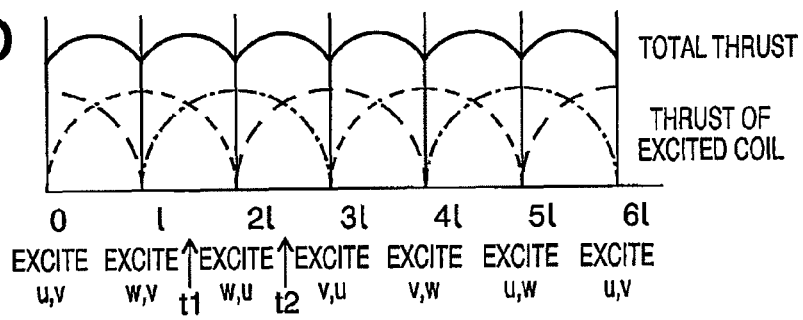

LINEAR ACTUATOR AND CAMERA SHAKE CORRECTION MECHANISM

BACKGROUND OF THE INVENTION

The present invention relates to a linear actuator configured to produce a thrust for linear movement, and particularly to enhancement of the strength of the thrust of the linear actuator.

The linear actuator, which is frequently called a linear motor, is configured to move one of a magnet and a coil by utilizing a thrust produced by electrifying the coil arranged in a magnetic field generated by the magnet. An example of a linear actuator is disclosed in Japanese Patent Provisional Publication No. 2007-282475A (hereafter, referred to as JP2007-282475A). In JP2007-282475A, it is disclosed that a mover is formed such that a plurality of permanent magnets are linearly arranged and an S pole and an N pole are alternately arranged in such a manner that that identical poles face with respect to each other, and that the coil serving as a stator is arranged in a magnetic field generated by the permanent magnets. In this configuration, by controlling a direction of a current to be supplied to the coil, a thrust is caused through the magnetic field generated by the permanent magnets, and the mover (i.e., the permanent magnet) is moved linearly by the produced thrust.

Japanese Patent Provisional Publication No. HEI 10-313566A (hereafter, referred to as JP HEI 10-313566A) also discloses an example of an actuator which is similar to that disclosed in JP2007-282475A. The linear actuator disclosed in JP HEI 10-313566A is configured such that a permanent magnet is arranged as a stator and a coil is arranged as a mover.

Each of the linear actuators disclosed in JP2007-282475A and JP HEI 10-313566A is configured such that the N pole and S pole are alternately arranged in the lengthwise direction, and a coil is formed of a three-phase coil to which currents having different phases are supplied. For example, with regard to the linear actuator disclosed in JP HEI 10-313566A having the coil serving as the mover, the three-phase coil is formed of three coils integrally arranged in a moving direction, and the current to be supplied to one or two of the three coils is controlled in a predetermined sequence so that thrusts are sequentially produced on the three coils in the moving direction. As a result, the mover can be moved linearly and continuously.

SUMMARY OF THE INVENTION

As described above, since the linear actuator disclosed in each of JP2007-282475A and JP HEI 10-313566A is configured to supply the current to one or two of the three coils forming the three-phase coil, the thrust is produced only by one or two coils to which the current is supplied. That is, assuming that the three coils have the same length, the obtained thrust is ⅓ or ⅔ of the thrust potentially obtainable from the three-phase coil. For this reason, when the actuator is downsized, the length of the coil inevitably decreases, and thereby it becomes difficult to obtain a strong thrust.

Furthermore, when the switching control for the current supplied to the three-phase coil is conducted, a state where two coils are not supplied with currents simultaneously arises. That is, a state where the thrust caused on two coils becomes zero arises. In this state, the total thrust produced on the three-phase coil decreases. Such a state appears as a ripple of the thrust. FIGS. 8A to 8D are explanatory illustrations for explaining occurrence of a ripple of the thrust.

As shown in FIG. 8A, a multipolar permanent magnet 11 is provided as a stator, and a three-phase coil body 21A is provided as a mover. The multipolar permanent magnet 11 is configured such that a rod-like member is magnetized to have an N pole and an S pole alternately arranged in a moving direction. By controlling the current to be supplied to a u-coil, a w-coil and a v-coil forming the three-phase coil body 21A, the thrust is produced. By connecting the u-coil, w-coil and v-coil as shown in FIG. 8B to form a Y-shaped joint and by electrifying terminals T1, T2 and T3 as shown in FIG. 8C so that two of the u-coil, w-coil and v-coil are magnetized sequentially, the thrust is produced for the magnetized coils as shown in FIG. 8D.

In FIG. 8D, a curve indicated by a long dashed line represents the thrust produced on the u-coil, a curve indicated by a short dashed line represents the thrust produced on the v-coil, and a curve indicated by a double chain line represents the thrust produced on the w-coil. For example, the thrust is produced by the w-coil and v-coil at (see time t1 in FIG. 8D), and the thrust is produced by the w-coil and u-coil (see time t2 in FIG. 8D). It is understood that, as shown by an upper side graph in FIG. 8D, the ripple is caused on the total thrust (i.e., the combined thrust) of the three-phase coil body 21A.

The present invention is advantageous in that it provides at least one of a linear actuator and a camera shake correction mechanism configured to suppress occurrence of a ripple of a thrust and thereby to enhance the total thrust produced on a coil body of the linear actuator.

According to an aspect of the invention, there is provided a linear actuator, which is provided with a multipolar magnet configured such that an S pole and an N pole are linearly aligned in an alternating manner, coil body having a plurality of separate coil units integrally arranged in a lengthwise direction of the coil body being provided to be movable relatively with respect to the multipolar magnet, a magnetic sensor that detects a position of the coil body along the lengthwise direction of the coil body with respect to the multipolar magnet, and an electrifying control circuit that individually controls currents to be supplied to the plurality of coil units based on the position of the coil body detected by the magnet sensor.

Such a configuration makes it possible to detect which of the S pole and N pole each of the coil units faces and thereby to switch the direction of the current supplied to each of the coil units in accordance with the detected position of each of the coil units. Consequently, it becomes possible to produce the thrust from all of the coil units forming the coil body, and thereby to suppress occurrence of a ripple of the thrust. Therefore, the linear actuator configured to be able to smoothly move with a high degree of thrust.

In at least one aspect, the electrifying control circuit may be provided with a position detection unit configured to detect a position of each of the plurality of coil units based on the position of the coil body detected by the magnet sensor, and an electrifying direction controller that switches a direction of the current to be supplied to each of the plurality of coil units based on a detection result of the position detection unit.

In at least one aspect, the position detection unit may be configured to detect which of the S pole and N pole each of the plurality of coil units faces. In this case, the electrifying direction controller switches the direction of the current to be supplied to each of the plurality of coil units depending on whether each of the plurality of coil units faces the S pole or the N pole.

In at least one aspect, the electrifying direction controller is provided with an H-bridge circuit having a plurality of switching transistors, and a gate controller that switches a gate current of each of the plurality of switching transistors.

In at least one aspect, the coil body and the magnetic sensor may be integrally arranged and move together with respect to the multipolar magnet.

In at least one aspect, the multipolar magnet may be formed as a stator, and the coil body and the magnet sensor may be formed as a mover.

In at least one aspect, the multipolar magnet may be formed as a mover, and the coil body and the magnet sensor may be formed as a stator.

In at least one aspect, each of the plurality of coil units may be formed of a single-thread coil in regard to the lengthwise direction of the coil body.

In at least one aspect, the multipolar magnet may include a multipolar permanent magnet formed by magnetizing an isotropic magnetic material such that an S pole and an N pole are alternately aligned in a lengthwise direction of the isotropic magnetic material.

In at least one aspect, the multipolar magnet may include a multipolar permanent magnet formed by arranging integrally a plurality of permanent magnets such that identical poles of the plurality of permanent magnets face with respect to each other.

According to another aspect, there is provided a camera shake correction mechanism, which includes a camera shake correction lens that is movably arranged in the camera shake correction mechanism, and one of the above described liner actuators. The linear actuator moves the camera shake correction lens in a direction perpendicular to an optical axis of the camera shake correction lens.

In at least one aspect, the camera shake correction mechanism may further include an X table that is movable in an X direction which is perpendicular to the optical axis of the camera shake correction lens, and an Y table that is supported on the X table and is movable in an Y direction which is perpendicular to the X direction. In this configuration, the camera shake correction lens is mounted on the Y table, and the linear actuator is provided for each of the X table and the Y table to move the X table in the X direction and to move the Y table in the Y direction.

According to another aspect of the invention, there is provided a camera shake correction mechanism, which includes an image pickup device that is movably arranged in the camera shake correction mechanism, and one of the above described liner actuators. The linear actuator moves the image pickup device in a direction perpendicular to an optical axis.

In at least one aspect, the camera shake correction mechanism may further include an X table that is movable in an X direction which is perpendicular to the optical axis, and an Y table that is supported on the X table and is movable in an Y direction which is perpendicular to the X direction. The image pickup device is mounted on the Y table, and the linear actuator is provided for each of the X table and the Y table to move the X table in the X direction and to move the Y table in the Y direction.

BRIEF DESCRIPTION OF THE ACCOMPANYING DRAWINGS

FIG. 2A is a conceptual diagram of the configuration of the linear actuator illustrated as a cross sectional view.

FIG. 2B is a conceptual diagram of the configuration of the linear actuator in which another example of a multipolar permanent magnet is employed.

FIGS. 7A and 7B illustrate a partial exploded perspective view of a camera having a camera shake correction mechanism to which the linear actuator is applied.

FIGS. 8A to 8D are explanatory illustrations for explaining occurrence of a thrust ripple on a three-phase coil.

DETAILED DESCRIPTION OF THE EMBODIMENTS

Hereinafter, an embodiment according to the invention is described with reference to the accompanying drawings.

Figure 1:
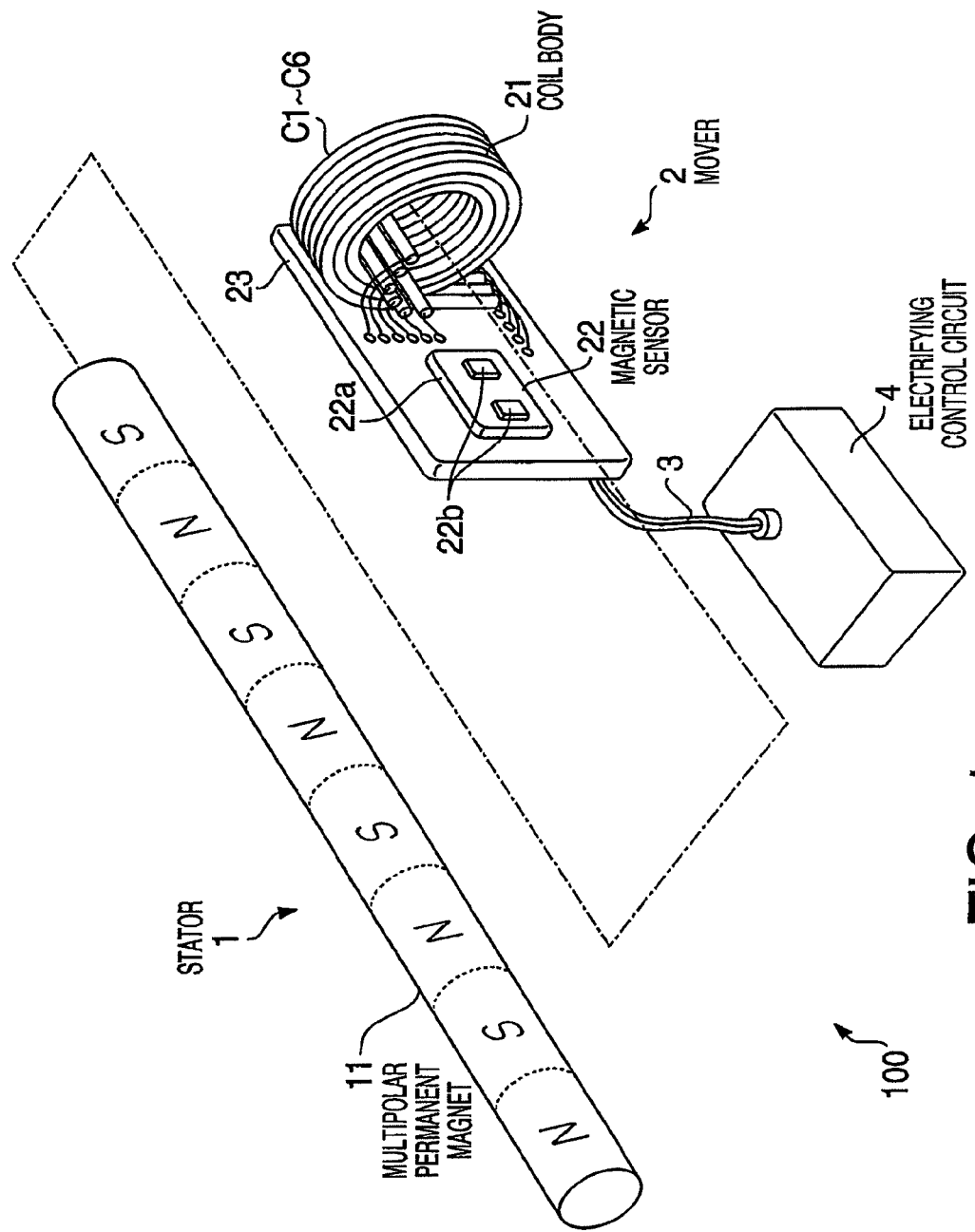
FIG. 1 is a perspective view illustrating a configuration of a linear actuator according to an embodiment.

FIG. 1 is a perspective view illustrating a configuration of a linear actuator 100 according to the embodiment. The linear actuator 100 includes a stator 1 formed of a multipolar permanent magnet 11 having a form of a cylindrical rod, and a mover 2 arranged to be able to reciprocate in the lengthwise direction of the stator 1. The mover 2 is driven relative to the stator 1 by a supporting mechanism (not shown). The mover 2 includes a coil body 21 and a magnetic sensor 22 which are both mounted on a common substrate 23. By moving the substrate 23 linearly in the lengthwise direction of the stator 1, the coil body 21 and the magnetic sensor 22 linearly move together.

The mover 2 is connected to an electrifying control circuit 4 via an elastic line code 3. In this configuration, an output of the magnetic sensor 22 is inputted to the electrifying control circuit 44. Based on the output of the magnetic sensor 22, the electrifying control circuit 4 controls a current to be supplied to the coil body 21 so that a thrust is produced on the coil body 21 and the linear movement of the mover 2 is controlled appropriately.

FIG. 2A is a conceptual diagram illustrating the configuration of the linear actuator 100. As shown in FIG. 2A, the stator 1 includes the multipolar permanent magnet 11, i.e., a single member having a form of a long cylindrical rod, configured such that an N pole and an S pole are alternately aligned at constant intervals in the lengthwise direction. The multipolar permanent magnet 11 can be made, for example, by magnetizing an isotropic magnetic material such that an S pole and an N pole are alternately aligned at the constant intervals.

Figure 3:
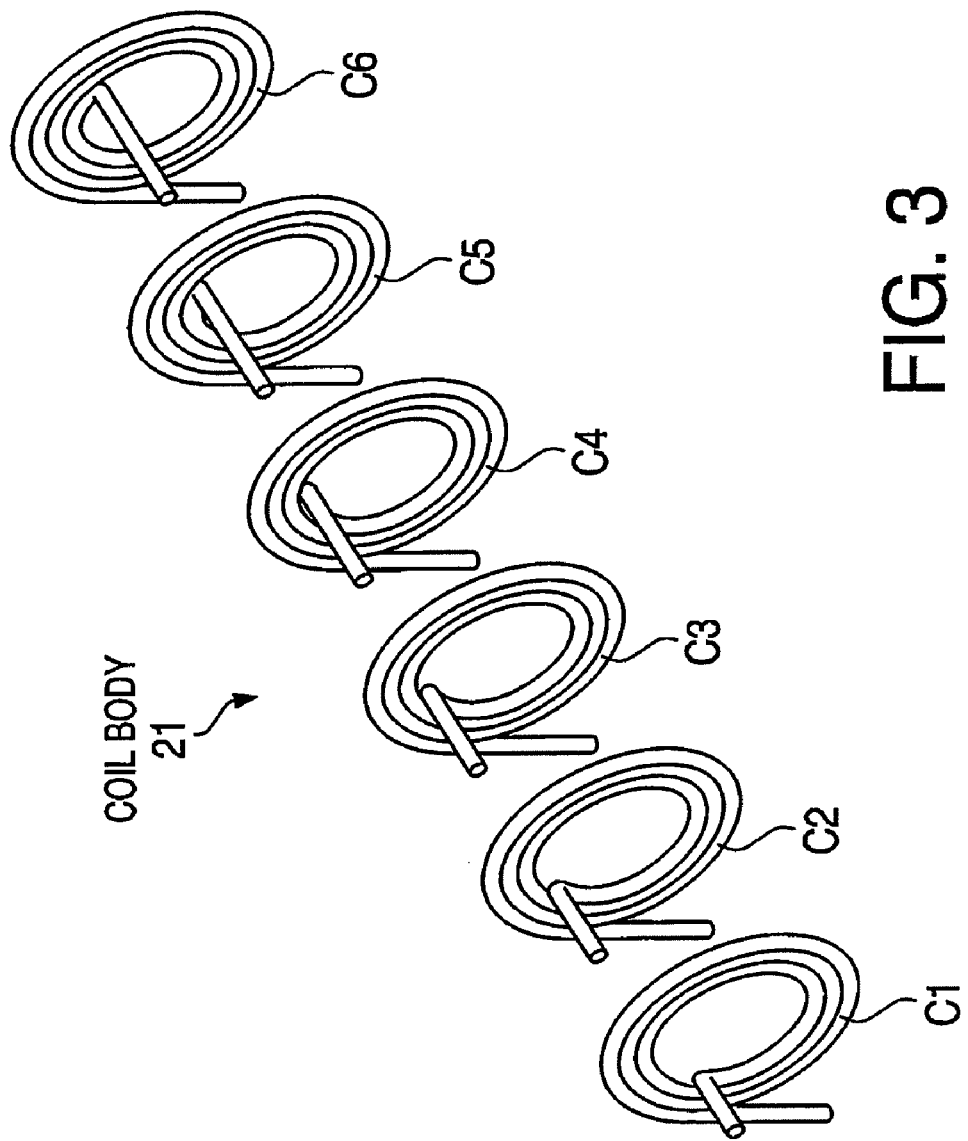
FIG. 3 is an exploded perspective view of a coil body provided in the linear actuator.

The coil body 21 of the mover 2 is formed of a plurality of individual coil units which are arranged in a moving direction. FIG. 3 is an exploded perspective view of the coil body 21. As shown in FIG. 3, the coil body 21 is configured such that the coil units C1 to C6, each of which is made from a predetermined number of turns (3 turns in FIG. 3) of a single-thread wire, are integrally arranged in the moving direction. Although the thickness of each coil unit (C1 to C6) is not limited to a particular value, the thickness of each coil unit (C1 to C6) is defined so that when the coil units C1 to C6 are arranged, the length of the coil body 21 in the moving direction becomes approximately equal to ⅔ of the arrangement pitch of the N pole and S pole of the multipolar permanent magnet 11. Furthermore, as described below, the linear actuator 100 is configured such that the direction of the current flowing through each of the coil units C1 to C6 can be controlled individually.

The magnetic sensor 22 of the mover 2 is formed of an MR (magneto-resistance) unit having magnet-resistances. More specifically, the magnetic sensor 22 includes a substrate 22a and a plurality of magneto-resistances 22b which are mounted on the substrate 22a. In this embodiment, two magneto-resistances 22b are aligned to have an interval which is ½ of each of the N pole and S pole. When the magnetic sensor 22 moves along the lengthwise direction of the multipolar permanent magnet 11, an internal resistance of each of the magneto-resistances 22b varies due to a magnetic field of each of the N pole and S pole, and therefore the output of the magnetic sensor 22 changes.

Figure 4:
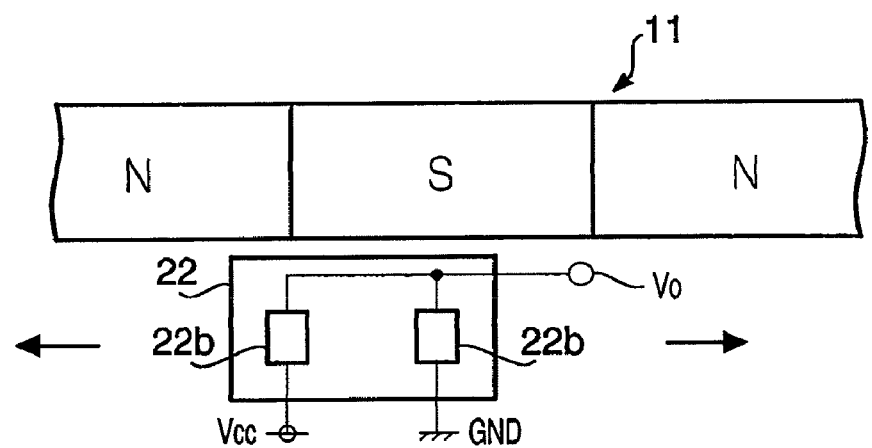
FIG. 4 is an explanatory illustration for explaining variation of an output of a magnetic sensor provided in the linear actuator.
Figure 4:
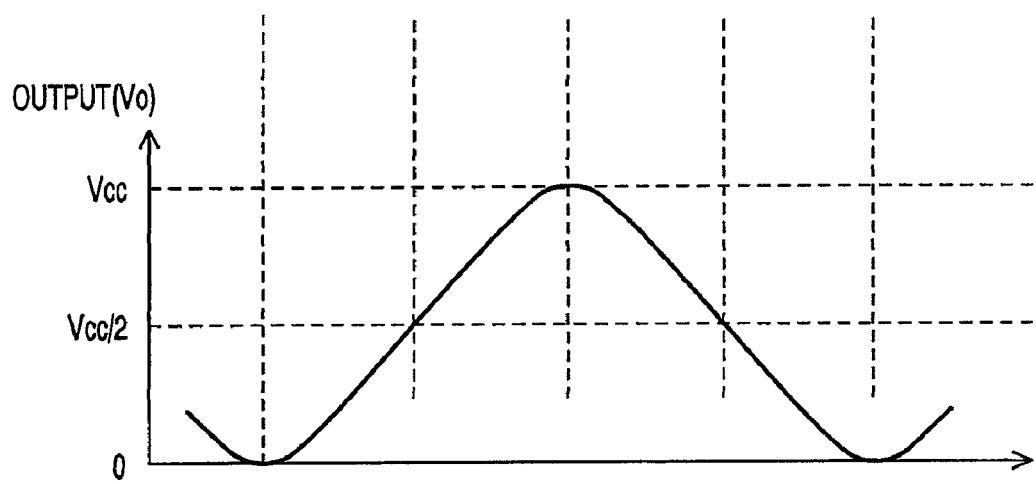

FIG. 4 is an explanatory illustration for explaining variation of the output of the magnetic sensor 22. As shown in FIG. 4 as an example, the two magneto-resistances 22b are connected in series between Vcc and GND, and the output Vo is pulled out from a joint point of the two magneto-resistances 22b. In this configuration, when the magnetic sensor 22 moves along the N pole and S pole of the multipolar permanent magnet 11, the output Vo of the magnentic sensor 22 changes such that the output Vo becomes Vcc at a position corresponding to the S pole, becomes 0 at a position corresponding to the N pole, and becomes Vcc/2 at a position corresponding to a boundary of the N pole and S pole. That is, the output Vo is equivalent to ½ frequency division of the output of each of the magneto-resistances 22b, and has a cycle equivalent to the pitch of the magnetic poles of the multipolar permanent magnet 11. Therefore, based on the output Vo, it is possible to detect the position of the magnet sensor 22, along the moving direction, with respect to the multipolar permanent magnet 11. In this embodiment, the distance between the center of the of the magnetic sensor 22 in the lengthwise direction and the center of the coil body 21 in the lengthwise direction is set to be equal to the pitch of the magnetic poles of the multipolar permanent magnet 11.

Figure 5:
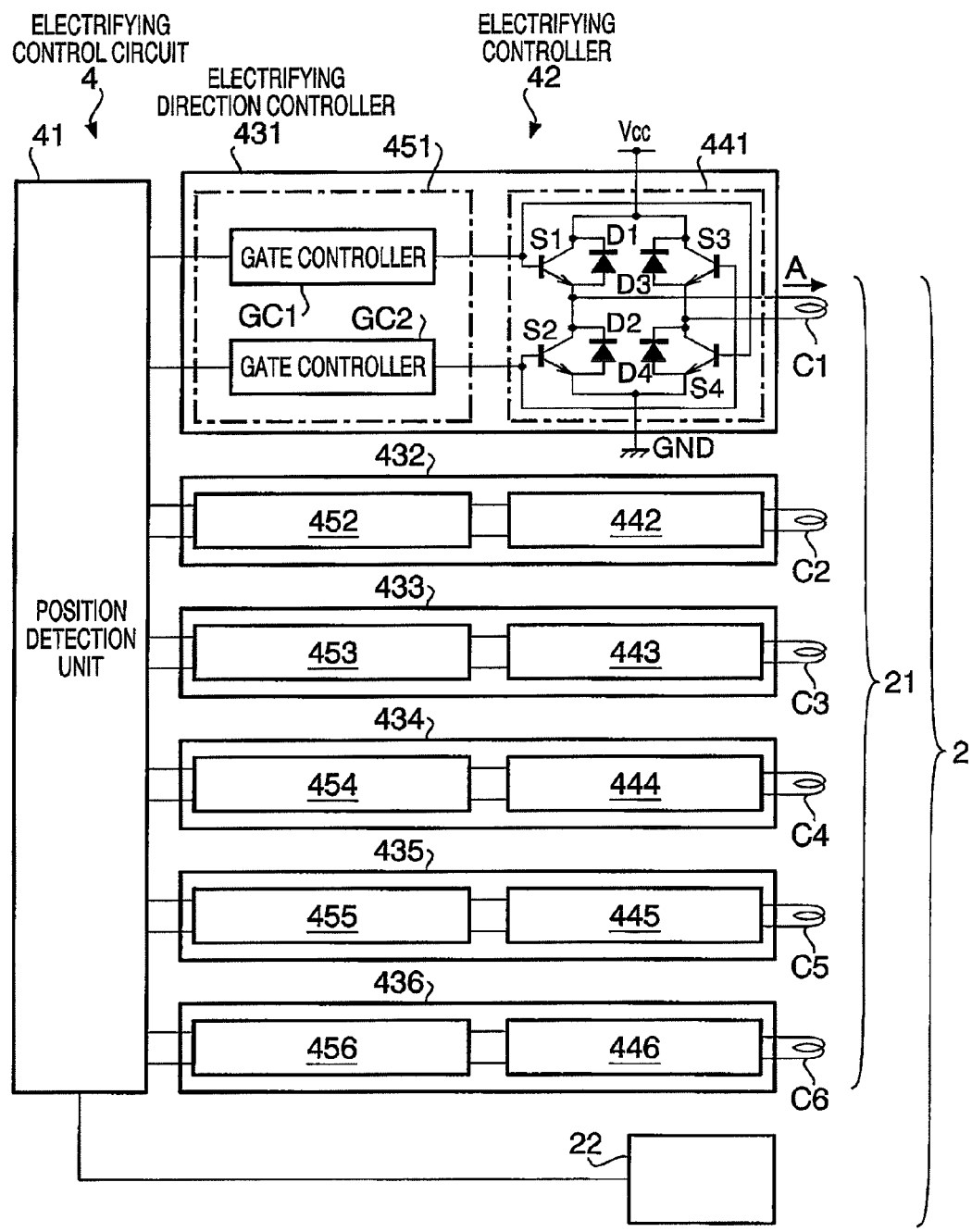
FIG. 5 is a circuit diagram of an electrifying control circuit.

As shown in FIG. 5, the electrifying control circuit 4 includes a position detection unit 41 which detects the position of the MR unit with respect to the multipolar permanent magnet 11 based on the output voltage of the magnet sensor 22, and an electrifying controller 42 which controls the current flowing through the coil body 21 based on the position of the magnet sensor 22 detected by the position detection unit 41. Based on a result of the detection, the position detection unit 41 calculates the position of the coil body 21 moving together with the magnetic sensor 22. As a result, the position detection unit 41 is able to detect respectively positions of the coil units C1 to C6 forming the coil body 21.

As shown in FIG. 5, the electrifying controller 42 includes electrifying direction controllers 431 to 436 respectively corresponding to the coil units C1 to C6. The electrifying direction controllers 431 to 436 include H-bridge circuits 441-446, respectively. Further, the electrifying direction controllers 431 to 436 include gate control units 451 to 456 respectively driving the electrifying direction controllers 431 to 436. The H-bridge circuits 441-446 respectively switch the electrifying directions of the coil units C1 to C6. The gate control units 451 to 456 respectively control switching of the electrifying direction controllers 431 to 436 based on the detection result of the position detection circuit 41.

Since the H-bridge circuits 441-446 have the same configuration, hereafter the H-bridge circuit 441 is explained, and explanations of the other H-bridge circuits will not be repeated for the sake of simplicity. The H-bridge 441 includes four switching transistors S1 to S4, and diodes D1 to D4 respectively connected with collectors and emitters of the transistors S1 to S4. The coil unit C1 is connected to a joint of the switching transistors S1 and S2 and to a joint of the switching transistors S3 and S4.

Since the gate control units 451 to 456 have the same configuration, hereafter the gate control unit 451 is explained, and explanations of the other gate control unit will not be repeated for the sake of simplicity. The gate control unit 451 includes a pair of gate controllers GC1 and GC2 which control the current to be supplied to bases of the four switching transistors S1 to S4. The gate controllers GC1 and GC2 on-off control alternatively the switching transistor S1 and S4 and the switching transistor S2 and S3.

More specifically, the gate controllers GC1 and GC2 of the electrifying controller 42 are configured to operate inversely with respect to each other based on the output from the position detection unit 41. For example, with regard to control by the gate control unit 451 with respect to the H-bridge circuit 441, when the gate controller GC1 turns on the switching transistors S1 and S4, the gate controller GC2 turns off the switching transistors S2 and S3. By this control, in the H-bridge circuit 441, a Vcc current flows through the switching transistors S1 and S4, and therefore the current flows through the coil unit C1 in a direction indicated by an arrow A1 (see FIG. 5). On the other hand, when the gate controller GC1 turns off the switching transistors S1 and S2 and the gate controller GC2 turns on the switching transistors S3 and S4, the Vcc current flows through the switching transistor S2 and S3, and therefore a current having an inverse direction of the arrow A flows through the coil unit C1. The same current control can be achieved by the H-bridge circuits 442 to 446 respectively for the coil units C2 to C6. Therefore, it is possible to separately switch the directions of the currents flowing through the coil units C1 to C6 respectively by the electrifying direction controllers 431 to 436.

Hereafter, operations of the linear actuator 100 are explained.

The electrifying control circuit 4 detects the current position of the mover 2. That is, in the electrifying control circuit 4, the position detection unit 41 detects the output voltage of the magnetic sensor 22, and detects the position of the magnetic sensor 22 along the moving direction with respect to the multipolar permanent magnet 11. Since the magnetic sensor 22 and the coil body 21 are integrally formed on the substrate 23, the relative position of the magnet sensor 22 and the coil body 21 in the moving direction is constant. Furthermore, the distance between the center position of the magnet sensor 22 and the center position of the coil unit 22 is approximately equal to the pitch of the magnet poles of the multipolar permanent magnet 11. Therefore, it is possible to detect the position of the coil body 21 with respect to the multipolar permanent magnet 11 based on the position of the magnet sensor 22. Furthermore, since the coil body 21 is configured to arrange the coil units C1 to C6 in the moving direction, it is possible to detect the position of each of the coil units C1 to C6 with respect to the multipolar permanent magnet 11 based on the position of the coil body 21.

Figure 6:
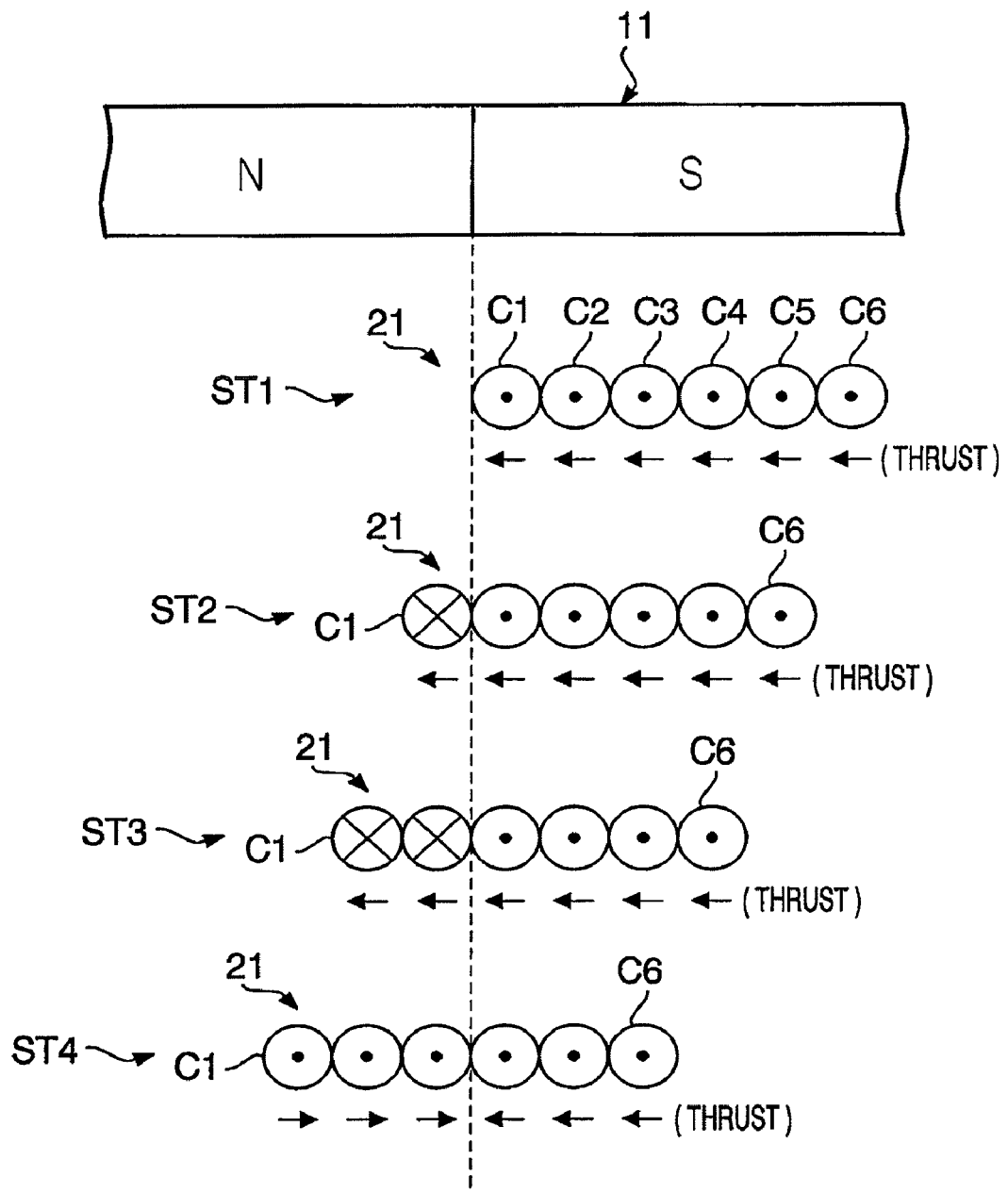
FIG. 6 is an explanatory illustration for explaining control for producing a thrust for each coil unit while showing a positional relationship between a multipolar permanent magnet and the coil body.

FIG. 6 is an explanatory illustration for explaining control for producing the thrust for each coil unit 21 while showing the positional relationship between the multipolar permanent magnet 11 and the coil body 21. In FIG. 6, four states ST1 to ST4 regarding the position of the coil body 21 are illustrated. It should be noted that by detecting the position of the coil body 21 (i.e., positions of the coil units C1 to C6) through the position detection unit 41, it is possible to detect which of the N and S poles each of the coil units C1 to C6 faces. Under the state ST1, it is detected that all of the coil units C1 to C6 face the S pole.

Based on the above described detection result, the position detection nit 41 controls the electrifying direction controllers 431 to 436 respectively corresponding to the coil units C1 to C6 to control the directions of the currents to be supplied to the coil units C1 to C6. In order to move the mover 2 (i.e., the coil body 21) in the leftward direction on FIG. 6, the electrifying direction controllers 431 to 436 execute control so that the current flowing in a direction from the rear side to the front side of paper of FIG. 6 (hereafter, referred to as A-direction) is supplied to each of the coil units C1 to C6. As described above, such control of the direction of the current can be achieved by on-off controlling the switching controllers S1 to S4 through the gate controllers GC1 and GC2 in each of the electrifying direction controllers 431 to 436. As a result, the thrusts indicated by short arrows are produced respectively for the coil units C1 to C6 in accordance with Fleming's left-hand rule (see the state ST1 in FIG. 6). It should be noted that the thrusts are combined and the mover 2 (i.e., the coil body 21) is moved in the leftward direction by the combined thrust.

When the mover 2 starts to move leftward and thereafter reaches the position indicated by the state ST2, the coil unit C1 which faced the S pole in the state ST1 reaches the position facing the N-pole. Is should be noted that if the direction of the current of the coil unit C1 is kept unchanged, the inverse thrust is produced for the coil unit C1. For this reason, when the position detection unit 41 detects that the coil unit C1 has moved to the position facing N pole, the electrifying direction controller 431 for the coil unit C1 operates to control the H-bridge circuit 441 through the gate controller 451 to change the direction of the current of the coil unit C1. As a result, the current of the coil unit C1 is switched from the A-direction to the inverse A-direction. Therefore, the thrust produced for the coil unit C1 is kept in the leftward direction.

When the mover 2 further moves leftward and then reaches the position indicated by the state ST3 in FIG. 6, the coil unit C2 which faced the S pole in the state ST2 reaches the position facing the N pole. In this case, the position detection unit 41 detects that the coil unit C2 has moved to the position facing the N pole. Then, the direction of the current of the coil unit C2 is switched from the A-direction to the inverse A-direction. As a result, the thrust produced for the coil unit C2 is kept unchanged. Similar to the above described control, the current of each of the coil units C3 to C6 is controlled in accordance with the positional relationship between the multipolar permanent magnet 11 and the coil body 21 so that the thrust of each of the coil units C3 to C6 is kept in the leftward direction.

As described above, the current of each of the coil units C1 to C6 forming the coil body 21 is controlled such that the thrust in the moving direction is produced constantly for the mover 2 in accordance with the magnetic poles of the multipolar permanent magnet 11. Therefore, according to the embodiment, it is possible to prevent occurrence of a phenomenon where, in regard to a conventional mover employing a three-phase coil, one of the coils is not electrified depending on the position in a moving direction of the mover. In other words, according to the embodiment, the thrust can be produced from the entire coil body 21 including the coil units C1 to C6.

It is understood that, according to the embodiment, the coil body is able to produce a stronger thrust in comparison with a three-phase coil if the coil body and the three-phase coil have the same length. In other words, under the condition where the strength of the thrust by the coil body is equal to the strength of the thrust by the three-phase coil, it is possible to decrease the length of the coil body 2 relative to that of the three-phase coil and thereby it becomes possible to downsize the linear actuator.

As described above, each of the coil units C1 to C6 is constantly supplied the current, and the direction of the current is switched only for one of the coil units C1 to C6 when the current switching is conducted in accordance with the position of the coil body 21. Therefore, even if a thrust ripple is caused for one of the coil units C1 to C6 when the current switching is conducted, the amount of the thrust ripple is very small and is negligible. As a result, it is possible to suppress the thrust ripple caused on the entire coil body 21, and thereby to achieve the smooth movement of the mover 2.

It is understood that in the situation where the coil body 21 moves from the N pole to the S pole, the current switching control is conducted to change the current for each of the coil units C1 to C6 from the inverse A-direction to A direction so that the thrust in the leftward direction is constantly produced. Regarding the moving control for moving the mover 2 rightward, moving control can be realized by a similar manner where the current in the inverse direction is supplied to each of the coil units C1 to C6.

In the above described embodiment, the coil body 21 is made from the six coil units C1 to C6, each of which is made of a single-thread coil. However, in another embodiment, the coil body may be made from a different number of coil units depending on the required thrust and the thrust ripple for the linear actuator.

Each coil unit may include a double-thread coil formed of two-turns of a wire arranged in the moving direction. Alternatively, each coil unit may include a coil formed of tree turns of a wire arranged in the moving direction. Regarding such a coil formed of more than one threads (i.e., a double-thread, a triple-thread . . . ), the current control may be conducted such that the direction of the current is switched when the entire coil unit passes a boundary between N and S poles.

In the above described embodiment, the multipolar permanent magnet functioning as a stator is formed of an isotropic magnetic material. However, as shown in FIG. 2B, a multipolar permanent magnet (11A) may be formed by arranging in series a plurality of short permanent magnets, each of which has N and S poles at its ends, so that the identical poles of the permanent magnets face with each other, and adhering the identical poles (S poles or N poles) with respect to each other. Alternatively, the multipolar permanent magnet (11A) may be formed by arranging in series the plurality of short permanent magnets and mechanically holding the plurality of short magnets by a holding member so that the identical poles (S poles or N poles) face with respect to each other.

In the above described embodiment, the multipolar permanent magnet serves as a stator and the coil body and the magnetic sensor server as a mover. However, it is understood that the advantages of the above described embodiment can be achieved by providing the multipolar permanent magnet and the coil body which are able to move relative to each other. Therefore, for example, the linear actuator may be configured such that the coil body and the magnetic sensor are formed as a stator, and the multipolar permanent magnet is formed as a mover.

In the above described embodiment, the electrifying direction controller is formed of the gate controller unit and the H-bridge circuit. However, the electrifying direction controller may be formed of a circuit which is able to switch the direction of the current supplied to the coil unit. That is, the electrifying detection controller is not limited to the circuit shown in the above described embodiment. For example, a switch which mechanically switches the current to be supplied to the coil unit may be employed depending on the size of the linear actuator.

The magnetic sensor is not limited to an MR element. For example, a hall device may be employed.

EXAMPLE

Hereafter, an example to which the above described linear actuator is applied is explained with reference to FIGS. 7A and 7B. FIG. 7A is a partial exploded perspective view of a camera having a camera shake correction mechanism to which the above described linear actuator is applied. As shown in FIG. 7A, the camera includes a shooting lens 101, an image pickup device 102 which picks up an image formed by the shooting lens 101, and a camera-shake correction mechanism 200 located between the shooting lens 101 and the image pickup device 102. The shooting lens 101 is supported by a lens frame 111, and a lens guide 112 is inserted into a part of the lens frame 111 so that the lens frame 111 is movable in a direction of an optical axis. Another part of the lens frame 111 is engaged with a lead screw 114 which is rotated by a step motor 113 fixed to a camera body (not shown). With this structure, the lens frame 111 (i.e., the shooting lens 101) is moved in the direction of the optical axis while being driven by the step motor 113. As a result, the image formed by the shooting lens 101 can be focused on the image pickup device 102.

The camera-shake correction mechanism 200 is arranged to be perpendicular to the optical axis. The lower end of the camera-shake correction mechanism 200 is supported by an X table guide 203 extending in a horizontal direction (X direction), and the camera-shake correction mechanism 200 includes an X table 201 having an X linear actuator 202 (which corresponds to the linear actuator 100 according to the embodiment) at the upper end thereof.

The X linear actuator 202 is configured such that the multipolar permanent magnet 11 is arranged in the X direction and both ends of the multipolar permanent magnet 11 serving as the stator 1 are fixed to the camera body (not shown), and the mover 2 including the coil body 21 and the magnetic sensor 22 is engaged with the X table 201 such that the mover 2 is able to reciprocate in X direction with respect to the multipolar permanent magnet 11.

Furthermore, the camera-shake correction mechanism 200 includes a Y table 211. The Y table 211 is configured such that the left end of the Y table 211 is supported by a Y table guide 213 extending in a vertical direction (Y direction), and a Y linear actuator 212 is provided in the Y table 211 at the right end thereof so that the Y table 211 is movable in Y direction.

The Y linear actuator 212 has the same structure as that of the X linear actuator 202. More specifically, the multipolar permanent magnet 11 serves as the stator 1 is provided in Y direction and both ends of the multipolar permanent magnet 11 are fixed to the X table 201, and the mover 2 including the coil body 21 and the magnetic sensor 22 is engaged with the Y table 211 such that the mover 2 is able to reciprocate in Y direction with respect to the multipolar permanent magnet 11.

A camera-shake correction lens 103 is supported on the Y table 211. The camera-shake correction lens 103 is able to shift the image formed by the shooting lens 101 in both of X and Y directions on an imaging surface of the image pickup device 101. With this configuration, the camera-shake correction lens 103 is able to cancel image shaking caused by the camera-shake by shifting the image formed by the shooting lens 101 in response to the camera-shake. The camera has a camera-shake correction circuit (not shown) which supplies a control current to the mover of the X linear actuator 202 and the mover of the Y linear actuator 212. The camera-shake correction circuit includes the electrifying control circuit 4 shown in FIG. 5, and is configured to control the direction of the current to be supplied to the coil body 21 of the mover 2 in accordance with a camera-shake correction signal.

In the status other than a releasing status, the camera-shake correction circuit supplies a predetermined current to the movers 2 of the X linear actuator 202 and the Y linear actuator 212 so that each of the movers 2 of the X linear actuator 202 and the Y linear actuator 212 is fixed at a predetermined position along the lengthwise direction of the multipolar permanent magnet 11. For example, as shown in a state ST4 of FIG. 6, by supplying the current in the same direction (i.e., the current in the A direction) to each of the coil units C1 to C6, the thrust caused on the left three coil units C1 to C3 and the thrust caused on the right three coil units C4 to C6 balance with respect to each other when the center of the coil body 21 is at the boundary between N and S poles, and in this case the moving par 2 is fixed at the boundary between N and S poles. Such current control can be applied to both of the X table 201 and the Y table 211. Therefore, it is possible to locate the camera-shake correction lens 103 supported on the Y table 211 on the optical axis of the shooting lens 101, and this position corresponds to an imaging center of the image pickup device 102.

When camera-shake is caused at the time of releasing, the camera-shake correction circuit detects X and Y components of the camera-shake and controls the current to be supplied to the movers 2 of the X and Y linear actuators 202 and 212 based on the detection result. As a result, the movers 2 of the X and Y linear actuators 202 and 212 are moved in X and Y directions, and accordingly the X table 201 and the Y table 211 are moved in X and Y directions, respectively. In this case, the lower end of the X table 201 is supported and guided by the X table guide 203, and the upper end of the X table 201 is supported and driven by the X linear actuator 202. The left end of the Y table 211 is supported and guided by the Y table guide 213, and the right end of the Y table 211 is supported and driven by the Y linear actuator 212.

As a result, the camera-shake correction lens 103 is moved in X and Y directions with respect to the optical axis of the shooting lens 101 so that the position of the image formed by the shooting lens 101 can be kept constant regardless of the camera-shake. Thus, the camera-shake can be corrected. During such a correcting operation, each of the X and Y linear actuators 202 and 212 detects the position of the coil body 21 with respect to the multipolar permanent magnet 11 through the magnetic sensor 22, and controls individually the currents to be supplied to the coil units C1 to C6 forming the coil body 21. Consequently, it becomes possible to enhance the strength of the thrust caused on the coil body 21 and to suppress the thrust ripple.

By thus applying the linear actuator to the camera-shake correction mechanism, it becomes possible to control the position of the camera-shake correction lens 103 to cancel the camera-shake at the time of releasing by simply controlling the current to be supplied to the mover of each of the X and Y linear actuators 202 and 212, while keeping the camera-shake correction lens 103 at the position on the optical axis in the state other than the time of releasing.

In the camera-shake correction mechanism 200, each of the X and Y linear actuator 202 and 212 can be formed by the stator 1 having the multipolar permanent magnet 11, and the mover 2 having the coil body 21 and the magnetic sensor 22. Such a structure makes it possible to reduce the size and weight of the camera-shake correction mechanism 200. Since the coil body 21 is configured such that all of the plurality of coil units C1 to C6 produce the thrust, it becomes possible to further downsize the camera-shake correction mechanism. Furthermore, since the thrust ripple can be suppressed, it becomes possible to correct the camera-shake suitably and smoothly.

Although the present invention has been described in considerable detail with reference to certain preferred embodiments thereof, other embodiments are possible.

As an another example of a camera shake correction mechanism, an image pickup device for picking up an image may be movable in X and Y directions which are perpendicular to the direction of the optical axis. The linear actuator according to the embodiment may be employed as a driving mechanism to move such an image pickup device in X and Y directions. In this case, the camera shake correction lens 103 is not required, and the image pickup device 102 can be mounted on the Y table 211 (see FIG. 7B).

The linear actuator according to the embodiment may also be applied to an aperture driving mechanism for driving an aperture of a shooting lens. In general, the aperture driving mechanism is configured to drive an aperture adjustment lever (for reducing or increasing the aperture size) by converting a rotational force produced by a motor into a linear force. In this regard, by employing the linear actuator according to the embodiment, it becomes possible to directly drive the aperture adjustment lever. Furthermore, the linear actuator according to the embodiment may be used as a driving source for an aperture mechanism accommodated in a shooting lens. Furthermore, the linear actuator according to the embodiment may be used as a driving source for a zooming mechanism or a focusing mechanism accommodated in a shooting lens.

This application claims priority of Japanese Patent Application No. P2009-024722, filed on Feb. 5, 2009. The entire subject matter of the application is incorporated herein by reference.

What is claimed is:

1. A linear actuator, comprising:
a multipolar magnet configured such that an S pole and an N pole are linearly aligned in an alternating manner;
a coil body having a plurality of separate coils integrally arranged in a lengthwise direction of the coil body, the coil body being provided to be movable relatively with respect to the multipolar magnet;
a magnetic sensor that detects a position of the coil body along the lengthwise direction of the coil body with respect to the multipolar magnet; and
an electrifying control circuit that individually controls currents to be supplied to the plurality of separate coils based on the position of the coil body detected by the magnet sensor,
wherein the electrifying control circuit comprises:
a position detector configured to detect a position of each of the plurality of separate coils based on the position of the coil body detected by the magnet sensor; and
an electrifying direction controller that switches a direction of currents to be supplied to each of the plurality of separate coils individually based on a detection result of the position detector.

2. The linear actuator according to claim 1, wherein:
the position detector is configured to detect which of the S pole and N pole each of the plurality of coil units faces; and
the electrifying direction controller switches the direction of the current to be supplied to each of the plurality of separate coils depending on whether each of the plurality of separate coils faces the S pole or the N pole.

3. The linear actuator according to claim 1,
wherein the electrifying direction controller comprises:
an H-bridge circuit having a plurality of switching transistors; and
a gate controller that switches a gate current of each of the plurality of switching transistors.

4. The linear actuator according to claim 1, wherein the coil body and the magnetic sensor are integrally arranged and move together with respect to the multipolar magnet.

5. The linear actuator according to claim 4, wherein:
the multipolar magnet is formed as a stator; and
the coil body and the magnet sensor are formed as a mover.

6. The linear actuator according to claim 4, wherein:
the multipolar magnet is formed as a mover; and
the coil body and the magnet sensor are formed as a stator.

7. The linear actuator according to claim 1,
wherein each of the plurality of separate coils is formed of a single-thread coil in regard to the lengthwise direction of the coil body.

8. The linear actuator according to claim 1,
wherein the multipolar magnet includes a multipolar permanent magnet formed by magnetizing an isotropic magnetic material such that an S pole and an N pole are alternately aligned in a lengthwise direction of the isotropic magnetic material.

9. The linear actuator according to claim 1,
wherein the multipolar magnet includes a multipolar permanent magnet formed by arranging integrally a plurality of permanent magnets, such that identical poles of the plurality of permanent magnets face each other.

10. A camera shake correction mechanism, comprising:
a camera shake correction lens that is movably arranged in the camera shake correction mechanism; and
a linear actuator according to claim 1,
wherein the linear actuator moves the camera shake correction lens in a direction perpendicular to an optical axis of the camera shake correction lens.

11. The camera shake correction mechanism according to claim 10, further comprising:
an X table that is movable in an X direction, which is perpendicular to the optical axis of the camera shake correction lens; and
an Y table that is supported on the X table and is movable in an Y direction, which is perpendicular to the X direction,
wherein:
the camera shake correction lens is mounted on the Y table; and
the linear actuator is provided for each of the X table and the Y table to move the X table in the X direction and to move the Y table in the Y direction.

12. A camera shake correction mechanism, comprising:
an image pickup device that is movably arranged in the camera shake correction mechanism; and
a linear actuator according to claim 1,
wherein the linear actuator moves the image pickup device in a direction perpendicular to an optical axis.

13. The camera shake correction mechanism according to claim 12, further comprising:
an X table that is movable in an X direction, which is perpendicular to the optical axis;
an Y table that is supported on the X table and is movable in an Y direction, which is perpendicular to the X direction,
wherein:
the image pickup device is mounted on the Y table; and
the linear actuator is provided for each of the X table and the Y table to move the X table in the X direction and to move the Y table in the Y direction.

* * * * *